June 10, 1952 J. H. TORSETH 2,600,140
COMMERCIAL TRUCK BODY
Filed April 26, 1948 2 SHEETS—SHEET 2

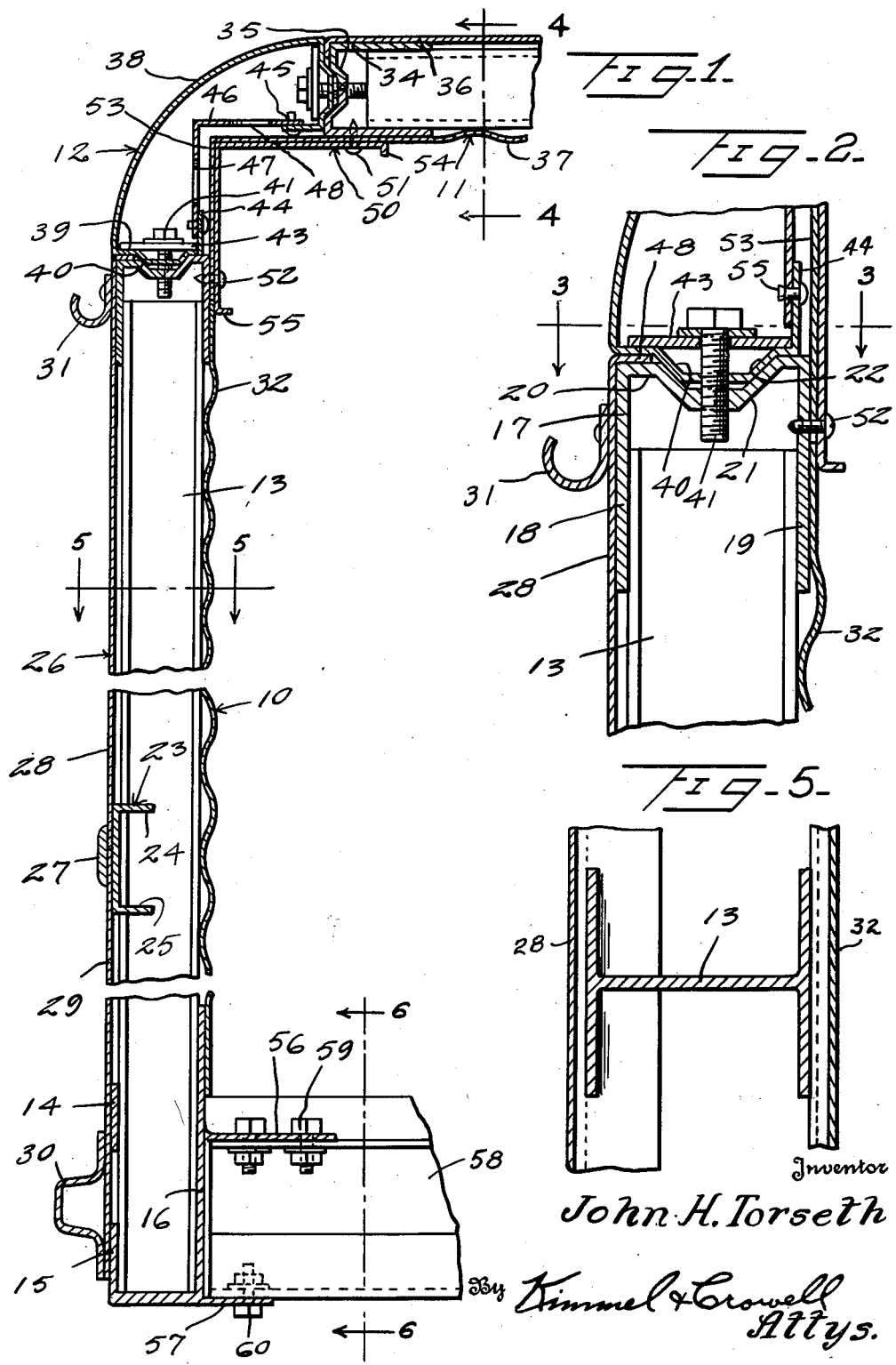

Inventor
John H. Torseth
By Kimmel & Crowell
Attys.

Patented June 10, 1952

2,600,140

UNITED STATES PATENT OFFICE 2,600,140

COMMERCIAL TRUCK BODY

John H. Torseth, Fargo, N. Dak.

Application April 26, 1948, Serial No. 23,325

1 Claim. (Cl. 296—28)

This invention relates to vehicle bodies.

An object of this invention is to provide a truck body wherein the sides, ends and top are formed of prefabricated panels connected together by means of detachable coupling means so that a damaged panel can be quickly removed for repair or replacement.

Another object of this invention is to provide a truck body wherein the detachable coupling means for the panels forms the corners between adjacent panels.

A further object of this invention is to provide an improved panel construction which is formed of rigid beams or studs with inner facing formed of corrugated aluminum sheet or plywood and outer facings of aluminum sheets or body steel.

A further object of this invention is to provide a truck body construction formed of connected together panels wherein the lower ends of the side panels are formed with a pair of lengthwise extending flanges for attachment to the floor beams.

A further object of this invention is to provide in a truck body construction of this kind an improved sealing means between the door and the door frame so as to form a weather-tight seal when the door is closed.

To the foregoing objects, and others which may hereinafter more fully appear, the invention consists of the novel construction, combination and arrangement of parts, as will be more specifically referred to and illustrated in the accompanying drawings, but it is to be understood that changes, variations, and modifications may be resorted to which fall within the scope of the invention as claimed.

In the drawings:

Figure 1 is a fragmentary vertical section of a vehicle body constructed according to an embodiment of this invention.

Figure 2 is a fragmentary enlarged vertical section of the upper portion of the body.

Figure 5 is a fragmentary sectional view taken on the line 5—5 of Figure 1.

Figure 3:
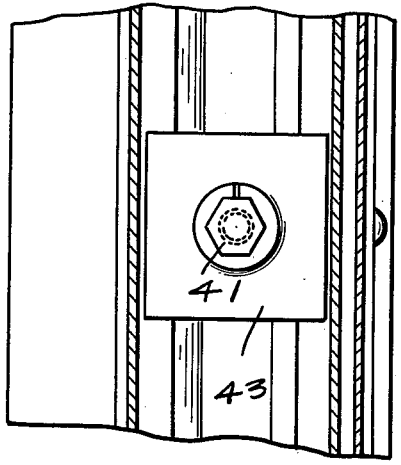
Figure 3 is a fragmentary sectional view taken on the line 3—3 of Figure 2.

Referring to the drawings, the numeral 10 designates generally a vertical side panel and the numeral 11 designates generally a top or roof panel. The side and top panels are connected together by means of a connector generally designated as 12. The side panel 10 is formed of a plurality of I or other shaped upright members 13, which may take the form of I-beams which at their lower ends engage in a horizontally disposed U-shaped channel member generally designated as 14. The lower channel member 14 is formed with an outer upright leg or side 15 and an inner upright leg or side 16 which is substantially of greater height than the outer leg 15. The lower ends of the studs or upright members 13 extend between the upright sides 15 and 16 of the lower channel member 14 being either welded or otherwise firmly secured therein. The uprights or studs 13 at their upper ends engage in an inverted U-shaped or channel member 17 which is formed of depending parallel sides 18 and 19 and a connecting wall 20 which is formed with a downwardly offset V-shaped rib 21 forming a V-shaped seat 22.

The uprights or studs 13 are also connected together between the upper and lower ends thereof by a horizontally extending channel member 23 which has the parallel sides 24 thereof extended into, and secured as by welding or the like, slots 25 which are formed in the outer sides of the uprights 13. The panel 10 has secured to the outer side thereof an outer facing sheet 26 which may be secured as by rivets or the like to the lower and upper channel members 14 and 17 respectively, and may also be secured to the intermediate horizontal channel member 23. A horizontally disposed covering strip 27 is adapted to cover the meeting edges of the two sheets 28 and 29 which form the outer facing 26. A lower horizontally disposed rub rail or flange 30 is secured to the lower portion of the lower sheet member 29 and an upper horizontally extending drip moulding 31 is secured to the upper portion of the sheet 28. This drip moulding is riveted through facing sheet 26 and (18, Fig. 9) this will hold facing sheet securely to channel member 17.

An inner facing or lining 32 is secured at its lower end to the upright side 16 of the lower channel member 14 and is secured at its upper portion to the inner side 19 of the upper channel member 17. The upper or top panel 11 is formed of a plurality of transversely extending parallel tubular members 33 which are substantially square in transverse section and the opposite ends of the tubular members 33 are secured within the opposite parallel sides of lengthwise extending U-shaped members 34 which are similar in every detail to the channel members 17. The channel members 34 are formed with V-shaped lengthwise extending seats 35, the purpose for which will be hereinafter described.

Figure 4:
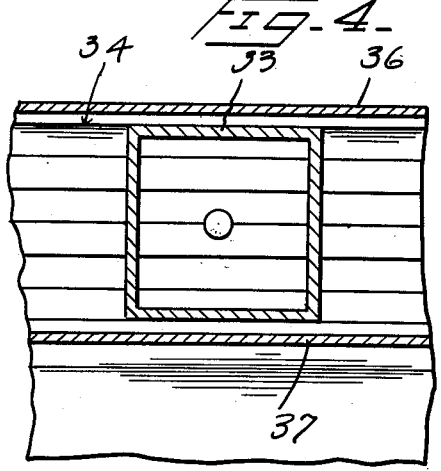
Figure 4 is a fragmentary sectional view taken on the line 4—4 of Figure 1.
Figure 6:
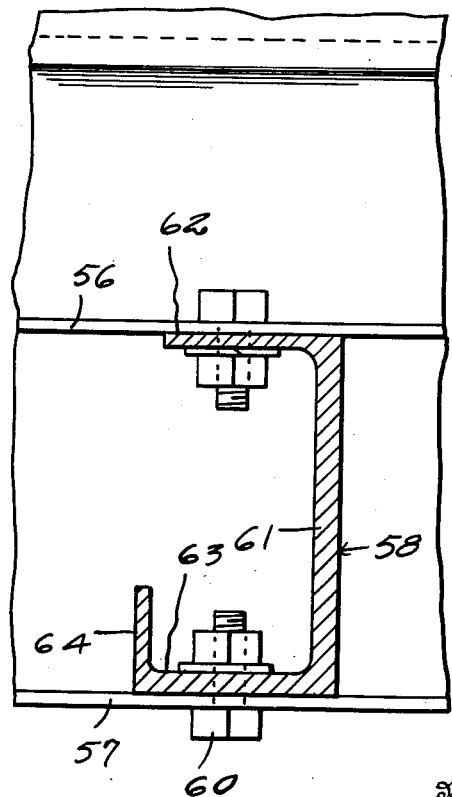
Figure 6 is a fragmentary sectional view taken on the line 6—6 of Figure 1.
Figure 7:
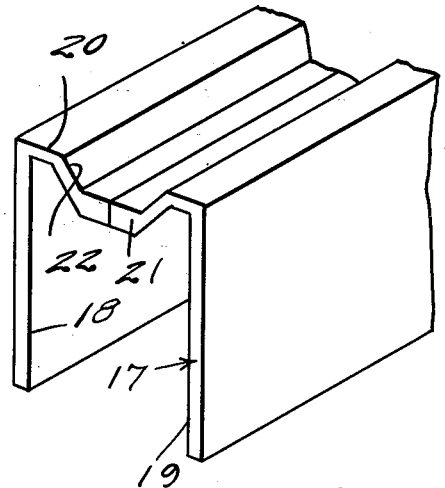
Figure 7 is a fragmentary perspective view of one of the upper channel frame members for the side and end panels.

The top member 11 has secured to the upper side thereof sheet 36 forming the roof and the lower side of the top member 11 has secured thereto a corrugated sheet 37. The connecting member 12 which is connected between the opposite sides and ends and the top of the body is formed of an elongated transversely arcuate sheet 38 which is formed with inwardly bent lengthwise edge portions 39 having lengthwise extending V-shaped ribs 40. The ribs 40 are adapted to engage on the seats 22 and to be secured thereto by means of bolts 41 which are extended through washers or plates 43. The inner edges of the inturned lengthwise portions 39 are bent upwardly to form a vertical flange 44 and the flange 44 of the lower edge of the connecting member 12 is connected to the flange 45 extending from the upper edge of the connecting member 12 by means of a right-angular connecting member 46. The connecting member 46 is formed with openings 47 and 48 in the opposite legs thereof so that a tool may be extended through the openings 47 and 48 to engage the bolts 41. As shown in Figure 4, the upper edge of the outer facing sheet 28 is bent inwardly as indicated at 49 so that when the connecting member 12 is fixed between the top and the sides and ends the upper edges of the outer facing 28 will be tightly clamped to the upper channel member 17.

An L-shaped connecting member 50 is secured by fastening means 51 and 52 to the top panel 11 and the side panel 10 and an interposed L-shaped member 53 is interposed between the L-shaped member 50 and the channel members 17 and 34. The lengthwise outer edges of the L-shaped member 50 are bent at right angles as indicated at 54 and 55. The L-shaped member 46 is adapted to be secured to the flanges 44 and 45 by a fastening means 55 so that the connecting member 12 will be formed as a hollow elongated body which can be secured as a unit to the side and end walls and the top wall or panel of the truck body.

The lower channel member 14 has extending from the inner side 16 thereof upper and lower horizontal flanges 56 and 57 and transversely extending floor beams 58 are secured between the flanges 56 and 57, the latter being substantially coplanar with the bight of U-shaped member 14 by fastening devices 59 and 60, respectively. The floor beams or supporting members 58 are formed of a vertical web 61 having a right-angular upper flange 62 and a right-angular lower flange 63 with a vertical short flange 64 extending from the free edge of the lower flange 63.

In the construction or assembly of a truck body as hereinbefore described, the floor beams 58 are secured in the channels formed between the flanges 56 and 57 carried by the side panel members 10. The arcuate connecting member 12 may be initially secured to the upper edges of the side panels 10 whereupon the top panel 11 may be secured to the inner edges of the connecting members 12. At the time the panels are being secured together at their upper portions, the L-shaped member 50 is removed so that the securing bolts 41 may be tightened along the lengthwise edges of the connecting member 14. After the side and end panels and the top panels are secured together thereby forming a completed body, the covering strips 50 may be secured between the upper portions of the side and top panels.

With a body as hereinbefore described, in the event any panel becomes damaged, the damaged panel can be readily replaced by inserting a new panel. The new panel can be inserted by removing the inner corner strips 50 and loosening the bolts 41 which are connected between the connecting member 12 and the injured panel. Furthermore, by providing the lengthwise ribs between the side, end and top panels and the meeting ribs on the connecting member 12, the connecting member will be firmly held against shifting either horizontally or vertically.

I claim:

A vehicle body comprising opposite side panels, opposite end panels, a top panel, connecting means between the upper edges of said side and end panels and said top panel, transverse floor beams, and means at the lower portions of said side panels supported by said floor beams, each side panel including inner and outer walls, vertical studs between said inner and outer walls, horizontal flange extending from the inner side substantially longer than the outer side, said vertical beams at their lower ends seating in said lower member and being fixed between the upright sides of said U-shaped member, a lower horizontal flange extending from the inner side of said U-shaped member substantially coplanar with the bight of the latter, a second horizontal flange carried by the inner side of said U-member spaced upwardly from said lower flange, and means securing the ends of said floor beams between said flanges.

JOHN H. TORSETH.

REFERENCES CITED

The following references are of record in the file of this patent:

UNITED STATES PATENTS

| Number | Name | Date |
| --- | --- | --- |
| 2,222,335 | Dietrich | Nov. 19, 1940 |
| 2,263,510 | Lindsay | Nov. 18, 1941 |
| 2,268,907 | Scott | Jan. 6, 1942 |
| 2,382,376 | Black | Aug. 14, 1945 |
| 2,400,253 | Ostlund | May 14, 1946 |
| 2,489,670 | Powell, Jr. | Nov. 29, 1949 |
| 2,504,657 | Dean | Apr. 18, 1950 |
| 2,534,501 | Coleman | Dec. 19, 1950 |

OTHER REFERENCES

"Knock-Down All-Aluminum Bodies Developed by Reynolds" in "Automotive and Aviation Industries," October 1, 1946, pages 44 and 77.